(No Model.) 2 Sheets—Sheet 1.
C. SCHMID.
VALVE MECHANISM FOR STEAM ENGINES.
No. 554,145. Patented Feb. 4, 1896.
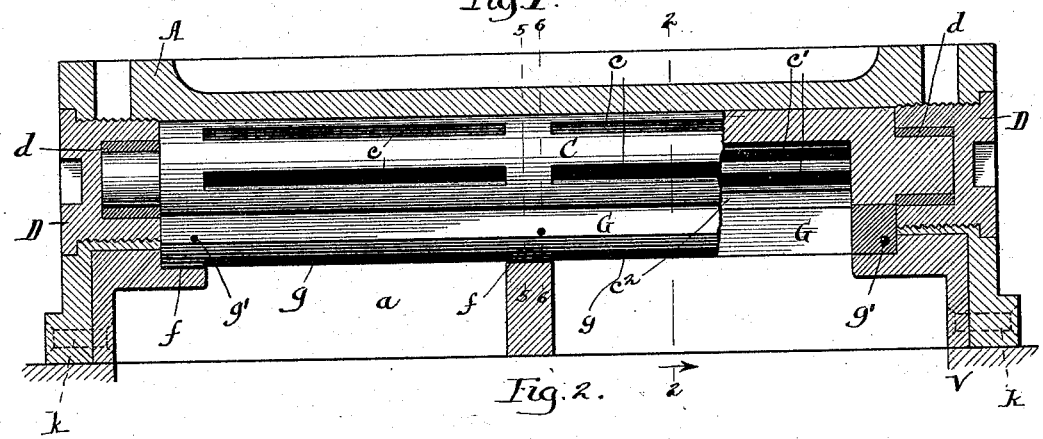
Fig. 1.
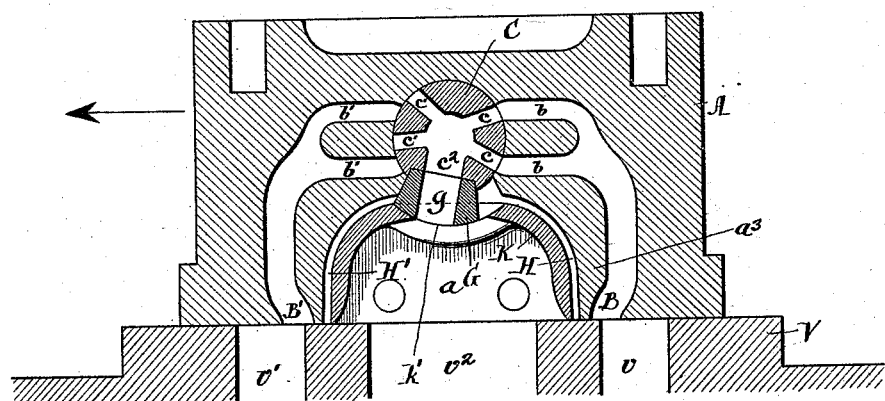
Fig. 2.
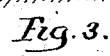
Fig. 3.
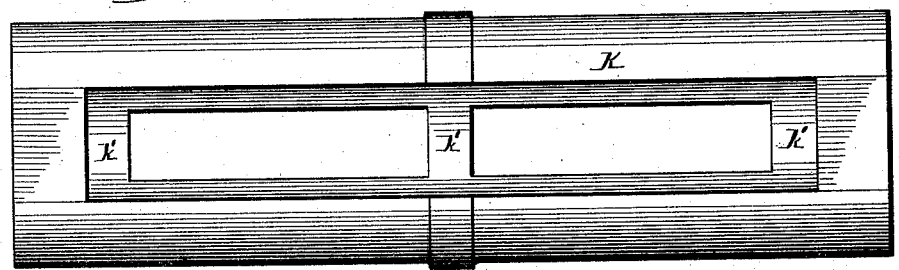
Fig. 5.
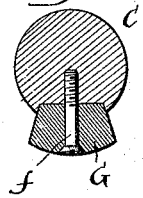
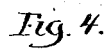
Fig. 4.
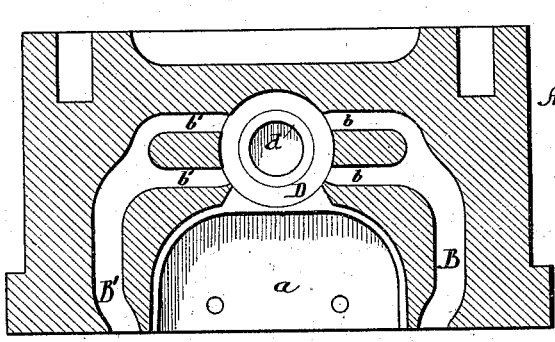
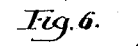
Fig. 6.
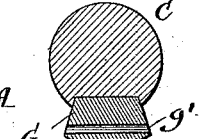
Witnesses:
Fred Gerlach
Alberta Adamick
Inventor:
Chas. Schmid
By Peirce & Fisher
Attorneys.

(No Model.) 2 Sheets—Sheet 2.

C. SCHMID.
VALVE MECHANISM FOR STEAM ENGINES.

No. 554,145. Patented Feb. 4, 1896.

Witnesses:
Fred Gerlach
Alberta Adamick

Inventor:
Chas. Schmid
By Pierce & Fisher
Attorneys.

UNITED STATES PATENT OFFICE.

CHARLES SCHMID, OF CHICAGO, ILLINOIS, ASSIGNOR OF ONE-HALF TO GEORGE FARNSWORTH, OF SAME PLACE.

VALVE MECHANISM FOR STEAM-ENGINES.

SPECIFICATION forming part of Letters Patent No. 554,145, dated February 4, 1896.

Application filed January 21, 1895. Serial No. 535,716. (No model.)

*To all whom it may concern:*

Be it known that I, CHARLES SCHMID, a citizen of the United States, residing at the city of Chicago, county of Cook, and State of Illinois, have invented certain new and useful Improvements in Valve Mechanism for Steam-Engines, of which I do declare the following to be a full, clear, and exact description, reference being had to the accompanying drawings, forming a part of this specification.

My present invention has relation to that class of valve mechanism for steam-engines in which provision is made for the release of the steam from the exhaust side of the cylinder-piston during the time that the live steam is acting within the cylinder both directly and expansively, the purpose being to relieve the back-pressure on the exhaust side of the piston.

The invention consists in various novel features of construction hereinafter described, illustrated in the accompanying drawings, and particularly defined in the claims at the end of this specification.

Figure 7:
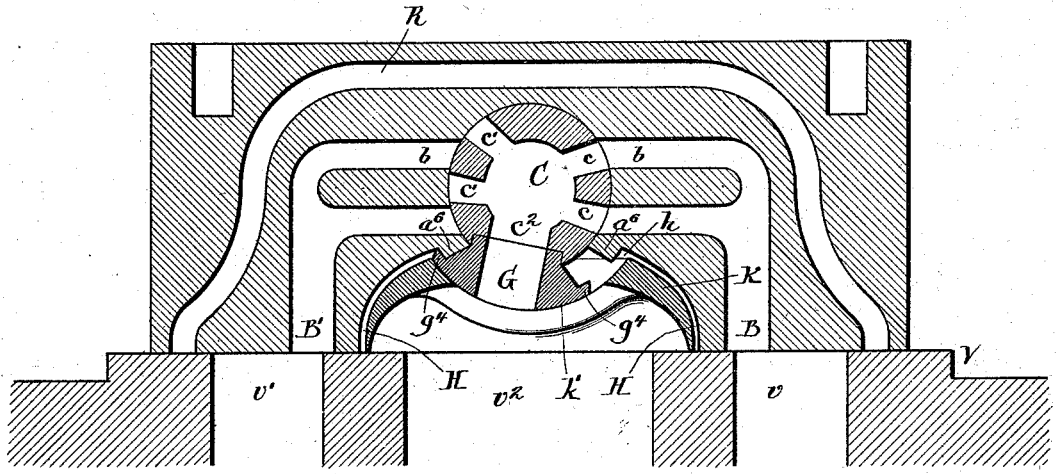
Figure 8:
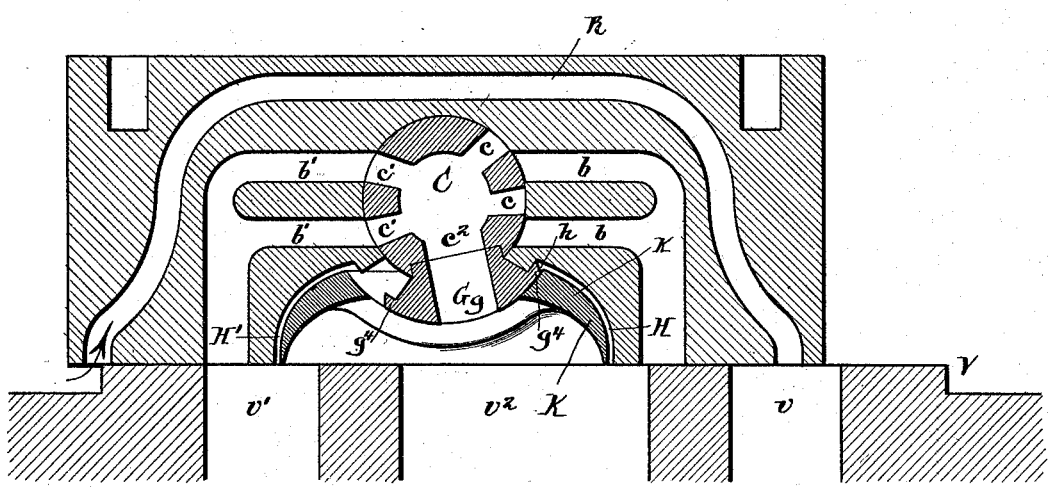

Figure 1 is a view in vertical cross-section through a slide-valve embodying my improvements, parts being shown in elevation. Fig. 2 is a view in vertical cross-section on line 2 2 of Fig. 1, looking in the direction of the arrow. Fig. 3 is a detail view of the exhaust-cavity plate or wall. Fig. 4 is a view in vertical cross-section upon line 2 2 of Fig. 1, but with the supplemental valve and the exhaust-cavity plate or wall removed. Figs. 5 and 6 are detail views in vertical cross-section through the supplemental valve, these sections being taken, respectively, on lines 5 5 and 6 6 of Fig. 1. Figs. 7 and 8 are views similar to Fig. 2, but showing a slightly-modified construction.

A designates the main body of the valve, this body being preferably, although not necessarily, formed of a single casting, as more particularly shown in Fig. 4 of the drawings.

The body A of the main valve is provided with an exhaust-cavity $a$ and with exhaust-ports B and B', these ports extending lengthwise of the valve-body in line with the exhaust-cavity and being preferably bifurcated at their upper ends to form the channels $b$ and $b'$. From end to end of the main slide-valve A is formed an opening adapted to receive the supplemental valve C, this supplemental valve C being preferably an oscillating valve and of the construction shown in Figs. 1 and 2 of the drawings.

The body of the supplemental valve C is cylindrical, and the ends of this valve are reduced to form journals that are pivotally mounted within suitable bushings or bearings $d$ carried by the screw-plugs D, one of these plugs D being inserted in each end of the main valve.

The supplemental valve C is formed with suitable escape-ports adapted to permit the escape into the exhaust-cavity of exhaust-steam entering the exhaust-ports B and B', and the body of the supplemental valve is so constructed that while the exhaust-steam is passing through one of the exhaust-ports—B, for instance—the supplemental valve will cut off the passage of steam to the opposite port, B'.

Preferably the supplemental valve C is provided with a series of long ports $c$ and $c'$ communicating, respectively, with the exhaust-port channels $b$ and $b'$, and is provided also with an escape-port $c^2$ to permit the passage of exhaust-steam from the ports $c$ and $c'$ into the exhaust-cavity $a$ of the main valve.

The supplemental exhaust-ports B and B' of the main-valve body are arranged at a slight distance inside the wall of the exhaust-cavity and extend to the face of the valve-seat V, that is provided with the usual admission and escape ports or steamways $v$ and $v'$ and main exhaust-port $v^2$.

I will next describe the operation of the parts thus far set forth, because, while I prefer to provide the particular means hereinafter described for shifting the supplemental valve, I wish my invention to be understood as covering the construction already defined, even if the particular means hereinafter described for effecting the shifting of the supplemental valve be not employed. Let it be assumed that the main slide-valve A has moved to the right to admit live steam to the cylinder through the port $v'$ and has returned to the position shown in Fig. 2, thereby cutting off the admission of live steam to the cylinder, and is still moving in the direction of the arrow, Fig. 2. It will be seen that after the admission of live steam to the cylinder through the port $v'$ has been cut off, and after the side wall or diaphragm $a^3$ of the main valve has closed the usual exhaust from the port or steamway $v$ over the adjacent bridge-wall of the valve-seat, a supplemental escape of steam from the exhaust side of the piston will occur through the exhaust-port B and through the supplemental valve C to the exhaust-cavity $a$ of the main valve, whence it will pass by the usual exhaust-port $v^2$ to the atmosphere; and this supplemental escape of exhaust-steam will continue until the outer edge of the port B has passed onto the bridge-wall between the ports $v$ and $v^2$. Hence it will be seen that a much longer escape of steam from the exhaust side of the piston is obtained than could be had with a slide-valve having no supplemental exhaust-ports B and B', since, manifestly, if these ports were absent the exhaust through the ports $v v'$ of the valve-seat would be closed at a much earlier period. It is obvious, also, that when the direction of travel of the main valve has been reversed, so that the exhaust from the main cylinder occurs through the exhaust-port $v'$, a supplemental exhaust will occur through the exhaust-port B' of the main valve and through the supplemental valve C, which prior thereto will be shifted by suitable means, preferably the mechanism next to be described.

To the lower part of the supplemental valve C is conveniently attached—as, for example, by the bolts $f$—a shifting bar G, having an exhaust channel or channels $g$ corresponding to and coincident with the exhaust-ports $c^2$ of the supplemental valve, and this shifting bar G extends in such position as to be shifted by steam, preferably exhaust, from the main cylinder. In order to conduct exhaust-steam from the main cylinder so that it shall shift the bar G and consequently the supplemental valve C at the proper times, I provide suitable channels H and H', and for convenience of construction these channels are preferably formed between the exhaust plate or wall K and the body of the main valve, as more particularly shown in Fig. 2 of the drawings.

The exhaust plate or wall K is preferably a casting of the construction illustrated in Figs. 1, 2, and 3, the end walls of this casting being bolted, as at $k$, to the end walls of the main-valve body A. The upper part of the exhaust-cavity plate K is preferably formed with the curved seat or recess $k'$, within which snugly fits, in a manner free to move, the shifting bar G. Preferably the shifting bar G is furnished with one or more perforations $g'$ to avoid air-cushioning of the shifting bar and thus permit it to be more promptly shifted.

From the foregoing description it will be seen that when the main slide-valve is in the position shown in Fig. 2 steam will escape freely from the exhaust side of the piston of the main cylinder through the steamway $v$, the escape-port B, and supplemental valve C to the exhaust-cavity $a$, while steam previously admitted into the cylinder through the steamway $v'$ is acting expansively within the cylinder. As the main slide-valve continues to move in the direction of the arrow, Fig. 2, in order to admit the live steam to the steamway $v$, the channel H' will pass from off the bridge-wall and will come above the steamway $v'$ and steam from the cylinder will instantly enter the channel H' and, acting upon the shifting bar G, will move this shifting bar and the supplemental valve to a position the reverse of that shown in Fig. 2 of the drawings, blanking the channels $b$ of the escape-port B and bringing the channels $c'$ of the supplemental valve coincident with the channels $b'$ of the escape-port B'. Hence it will be seen that as the slide-valve continues to move in the direction of the arrow, Fig. 2, so as to admit live steam to the steamway $v$, the port B' will have released the steam from the opposite side of the piston and will afford a free escape for the exhaust-steam. The main valve continuing to thus move in the direction of the arrow, Fig. 2, will cause the supplemental cavity-plate to pass above the steamway $v'$, thereby allowing also the exhaust of steam from the steamway $v'$ over the bridge-wall into the exhaust-port $v^2$. When the direction of travel of the main slide-valve is reversed, so as to cut off the admission of live steam to the port $v$, it will be seen that the exhaust of steam from the cylinder through the steamway $v'$ will continue until the usual exhaust from this steamway $v'$ over the adjacent bridge-wall has occurred, but will continue also until the exhaust-port B' has passed from above the steamway $v'$ and onto the bridge-wall, thereby blanking this port. Hence it will be seen that a much fuller and freer exhaust of steam from the cylinder can be had than would be possible if the escape-ports B and B' were not provided.

It is manifest that the details of construction above set out may be varied within wide limits without departing from the spirit of the invention, and, except as specifically stated in the claims, I do not wish the invention to be understood as restricted to such details.

In Figs. 7 and 8 of the drawings I have shown a slightly-modified form of the invention. In these figures the body of the main valve is shown as provided with a supplemental admission-channel R, extending from the face of the valve at each side adjacent its outer edges and around over the top of the valve. The purpose of this supplemental admission-channel R is to enable a more rapid admission of steam, thereby causing the steamways $v$ and $v'$ to be more quickly filled. Thus by reference to Fig. 8 it will be seen that when the parts are in the position there shown the live steam is being admitted to the steamways $v$ not only at the adjacent edge of the valve-body, but live steam is also being admitted to the steamway $v$ through the supplemental admission-channel R, this channel taking live steam from the opposite side of the valve, as indicated by the arrow. In this form of my invention I have shown the shifting bar G of the supplemental valve C as provided with lateral flanges $g^4$ at its opposite sides, these flanges being adapted to enter the discharge ends $h$ of the supplemental channels H and H'. The purpose of the flanges $g^4$ is to better aid in cushioning the supplemental valve, and it will be seen that as this valve is shifted by the exhaust-steam passing up the channel H' from the position shown in Fig. 7 to the position shown in Fig. 8 exhaust-steam passing up this channel H' will also pass through the ports $g'$ of the shifting bar to the opposite side of said bar, and as soon as the edge of the flange $h$ at said opposite side of the shifting bar passes into the mouth $h$ of the channel H a certain amount of steam will be confined temporarily between the body of the shifting bar and the portion $a^6$ of the main-valve body. By this means the "hammering" of the supplemental valve will be avoided, although it is obvious that the ports $g$ will permit the confined steam that has thus acted as a cushion to release as soon as the flange $g^4$ at the opposite side of the shifting bar has passed from above the edge of the exhaust-cavity plate K.

Having thus described the invention, what I claim as new, and desire to secure by Letters Patent, is—

1. A valve for steam-engines comprising a body provided with escape ports and channels leading from the face of the valve adjacent its exhaust-cavity and a supplemental valve provided with individual ports alternately connecting with said escape ports or channels and provided also with a common port for connecting said individual ports with the exhaust.

2. In a valve for engines comprising a main body having escape-ports at each side of the exhaust-cavity and a supplemental valve pivotally sustained to turn in a vertical plane and arranged in position to control the flow of the exhaust through said escape-ports, said supplemental valve having a chamber extending lengthwise thereof and having individual escape-ports leading from said chamber to the escape-ports in the main body and having also an escape-port leading from said chamber to the exhaust-cavity of the main valve.

3. A valve comprising a main body having escape-ports leading from the opposite sides of the exhaust-cavity and a supplemental valve provided with ports whereby said escape-ports may be alternately connected with the exhaust, said supplemental valve having a part exposed to the action of steam in order to effect its shift.

4. A valve comprising a main body having exhaust-ports on each side of the exhaust-cavity and comprising a horizontally-pivoted supplemental valve for controlling said escape-ports, said supplemental valve being provided with a part exposed to the exhaust-steam whereby the shift of the supplemental valve can be effected.

5. A valve comprising a main body having escape-ports leading from opposite sides of the exhaust-cavity and having supplemental channels also leading from opposite sides of the exhaust-cavity and a horizontally-pivoted supplemental valve for controlling said escape-ports, said supplemental valve being provided with a part exposed to the steam passing through said supplemental channels at each side of the exhaust-cavity, whereby the oscillation of the supplemental valve can be effected.

6. A valve comprising a main body having escape-ports leading from the opposite sides of the exhaust-cavity and having supplemental channels also leading from the opposite sides of the exhaust-cavity, said supplemental channels being arranged nearer the exhaust-cavity than said escape-ports, and a supplemental valve for controlling the escape of exhaust-steam through said ports, said supplemental valve being arranged to alternately connect said escape-ports with the exhaust and having a part exposed to the supplemental channels on each side of the exhaust-cavity of the main valve.

7. A valve comprising a main body having escape-ports on opposite sides of the exhaust-cavity, a supplemental valve for alternately connecting said escape-ports with the exhaust, a supplemental exhaust-cavity plate arranged at a slight distance from the main body of the valve to form channels for exhaust-steam on each side of the exhaust-cavity, and a part connected to said supplemental valve and extending in position to be acted upon by the exhaust-steam passing through said supplemental channels.

8. A valve comprising a main body having escape ports or channels leading from its face to a chamber within the upper part of the valve-body, said channels being branched at their upper ends, and a supplemental valve provided with a series of ports arranged to alternately connect said escape-ports with the exhaust.

9. A valve for steam-engines comprising a main body having a chamber extending from end to end thereof, and having escape-ports at each side of its exhaust-cavity and a pivoted supplemental valve extending lengthwise of said main valve and suitable plugs at the ends of said main valve wherein said supplemental valve is journaled.

10. A valve for engines comprising a main body having escape-ports at each side of the exhaust-cavity and a pivoted supplemental valve extending lengthwise of said main valve and controlling said ports and a shifting bar connected to said supplemental valve, and suitable channels for admitting steam to opposite sides of said shifting bar.

11. A valve for engines comprising a main body having escape-ports leading from opposite sides of the exhaust-cavity, and having a chamber into which said exhaust-ports lead, a supplemental valve for controlling the passage of steam through said exhaust-ports, said supplemental valve being provided with a shifting bar having perforations to permit steam to cushion the throw of the supplemental valve.

12. A valve for steam-engines comprising a main body having escape-ports leading from each side of the exhaust-cavity, a supplemental valve for controlling the flow of the exhaust through said escape-ports, said supplemental valve being provided with a shifting bar, supplemental channels at each side of the exhaust-cavity for admitting steam to said shifting bar, said shifting bar being provided with flanges at its opposite sides to form an air-cushion.

13. A valve for steam-engines comprising a main body having escape-ports leading from each side of the exhaust-cavity, a supplemental valve for controlling the flow of the exhaust through said escape-ports, said supplemental valve being provided with a shifting bar or part, supplemental channels at each side of the exhaust-cavity for admitting steam to shift said supplemental valve, said supplemental channels communicating also with the exhaust-cavity of the valve.

CHARLES SCHMID.

Witnesses:
GEO. P. FISHER, Jr.,
FRED GERLACK.